No. 893,222. PATENTED JULY 14, 1908.
P. BERNSTEIN.
HYDRAULIC AIR COMPRESSOR.
APPLICATION FILED DEC. 17, 1906.
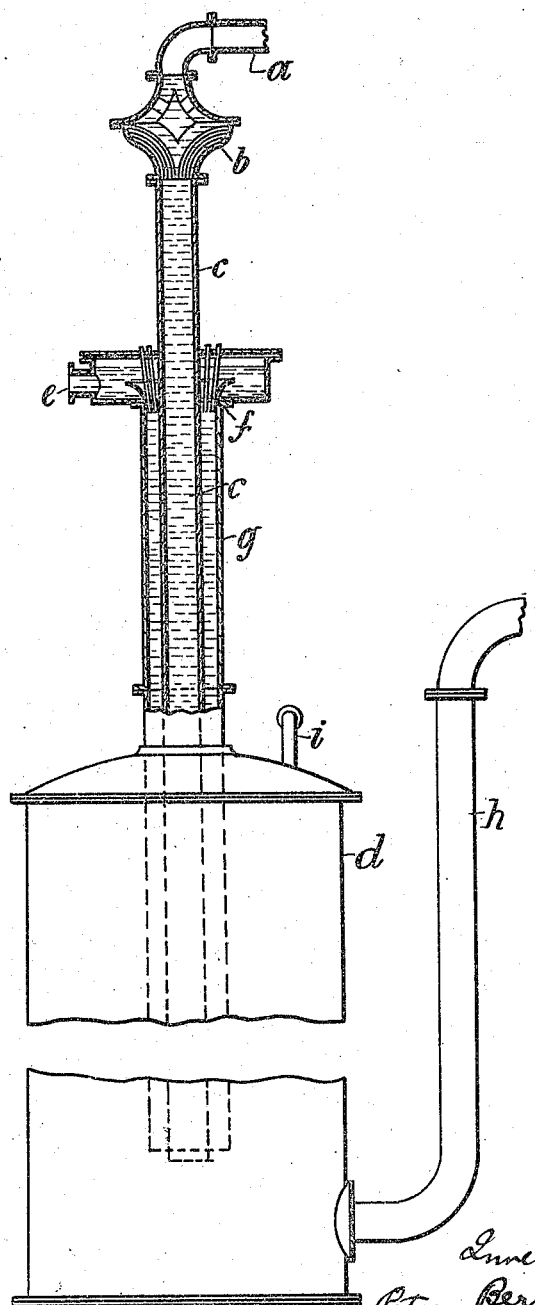

UNITED STATES PATENT OFFICE.

PETER BERNSTEIN, OF MÜLHEIM-ON-THE-RHINE, GERMANY.

HYDRAULIC AIR-COMPRESSOR.

No. 893,222.

Specification of Letters Patent.

Patented July 14, 1908.

Application filed December 17, 1906. Serial No. 348,179.

*To all whom it may concern:*

Be it known that I, PETER BERNSTEIN, a subject of the Emperor of Germany, residing at Mülheim-on-the-Rhine, Germany, have invented new and useful Improvements in Hydraulic Air-Compressors, of which the following is a specification.

The present invention relates to hydraulic air-compressors in which the energy of streams of water coming from different heights can be utilized in one and the same compressing apparatus which is particularly advantageous in mines.

The accompanying drawing shows a vertical section through such an air-compressor.

$a$ is the conduit carrying the water coming from the greatest height, $b$ is a suction device for the air, $c$ is the down flow conduit, $d$ is the separating chamber, $e$ is another conduit carrying water coming from a lower height, $f$ is a suction device for it, $g$ is the down flow conduit therefrom, which is in close proximity to the conduit $c$ and may surround it. Both discharge into the same separating chamber $d$.

$h$ is the discharge conduit for the water, $i$ is the outlet for the compressed air.

The water coming from both heights $a$ and $e$ falls upon the bottom of the separating chamber $d$, carrying the air bubbles with it. The air bubbles then rise to the upper part of this chamber while the water is discharged through the conduit $h$. The height of this discharge conduit fixes the compression of the air in the upper part of the chamber $d$.

If it is desired to produce a compression of air in the separating chamber $d$ equal to four atmospheres, the height of the discharge tube or channel $h$, through which the water leaves the separating chamber $d$, must be 40 meters. If the conduit $a$ has a height of 120 meters from the water level in the separating chamber $d$, the down flow conduit $c$ which is used for carrying the mixture of water and air from this height is $120 - 40 = 80$ meters. If the conduit $e$ has a height of 80 meters, the utilizable height of its down flow conduit $g$ is $80 - 40 = 40$ meters. Thus each down flow conduit is of sufficient height to overcome the counter-action of water in the discharge channel.

What I claim as my invention is:

In a hydraulic air compressing apparatus, the combination of a plurality of conduits leading water from different heights, air inlets in the upper part of each conduit through which air is introduced by suction, a receiving chamber on a lower level common to all the conduits into which the air and water are separated and the air compressed, an outlet for compressed air in the upper part of the receiving chamber and a water discharge pipe communicating with the lower part of the receiving chamber and extending upward therefrom to any desirable height, so as to maintain hydrostatic pressure in the chamber, substantially as described.

In witness whereof I have hereunto set my hand in presence of two witnesses.

PETER BERNSTEIN.

Witnesses:
MICHAEL ZIMMERMANN,
GUSTAV LOEHR.